United States Patent
Comeaux

(10) Patent No.: US 8,662,473 B2
(45) Date of Patent: Mar. 4, 2014

(54) REPLACEABLE FLOATING GATE VALVE SEAT SEAL

(75) Inventor: David Daniel Comeaux, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 284 days.

(21) Appl. No.: 13/079,874

(22) Filed: Apr. 5, 2011

(65) Prior Publication Data

US 2012/0256113 A1 Oct. 11, 2012

(51) Int. Cl.
*F16K 25/00* (2006.01)

(52) U.S. Cl.
USPC ........... 251/174; 251/176; 251/193; 251/196; 251/328

(58) Field of Classification Search
USPC .................. 251/328, 172, 174, 193, 195, 196
See application file for complete search history.

(56) References Cited

U.S. PATENT DOCUMENTS

| | | | | |
|---|---|---|---|---|
| 4,741,509 A * | 5/1988 | Bunch et al. | ................... | 251/172 |
| 5,192,051 A | 3/1993 | Roberson | | |
| 5,370,362 A | 12/1994 | Kent et al. | | |
| 6,345,805 B1 * | 2/2002 | Chatufale | ..................... | 251/172 |
| 6,454,015 B1 | 9/2002 | Armstrong et al. | | |
| 6,648,001 B2 * | 11/2003 | Chatufale | .................. | 137/15.18 |
| 6,664,572 B2 * | 12/2003 | Chatufale | ..................... | 257/172 |
| 6,929,244 B1 | 8/2005 | Law et al. | | |
| 7,004,452 B2 * | 2/2006 | Chatufale | ..................... | 251/171 |
| 7,325,783 B2 | 2/2008 | Hunter | | |
| 7,819,378 B2 | 10/2010 | Jennings | | |
| 8,091,861 B2 * | 1/2012 | Nesje | ............................. | 251/282 |

FOREIGN PATENT DOCUMENTS

| | | |
|---|---|---|
| GB | 2352494 A | 1/2001 |
| GB | 2425819 A | 11/2006 |
| WO | 2008/063073 A | 5/2008 |

OTHER PUBLICATIONS

GB Search Report dated May 9, 2012 from corresponding Application No. GB1205894.7.

* cited by examiner

*Primary Examiner* — John K Fristoe, Jr.
*Assistant Examiner* — Marina Tietjen
(74) *Attorney, Agent, or Firm* — Bracewell & Giuliani LLP

(57) ABSTRACT

A gate valve includes a floating gate valve seat that effects a seal between a gate of a gate valve and a gate valve body using a metal seal. The gate valve includes a floating gate valve seat interposed between a gate and a gate valve body. The gate valve seat has a spring member with a cylindrical portion secured to the gave valve seat. The spring member has a leg that exerts a spring force against the gate valve body to maintain a seal between the floating gate valve seat and the gate. A metal-to-metal seal seals between the cylindrical portion of the spring member and a cylindrical portion of the gate valve seat.

17 Claims, 5 Drawing Sheets

REPLACEABLE FLOATING GATE VALVE SEAT SEAL

BACKGROUND OF THE INVENTION

1. Field of the Invention

The present invention relates in general to slab style gate valves and, in particular, to a replaceable seal for sealing between a floating gate valve seat and a gate valve body.

2. Brief Description of Related Art

A typical gate valve used in connection with oil and gas production has a body with a flow passage extending through it. The flow passage intersects a central cavity. Seat rings are placed in counterbores formed in the flow passage at the intersection of the flow passage with the cavity. A gate will variably move through the central cavity to block the flow passage. The seal rings bridge a gap between the valve body and the gate to prevent fluid from flowing around the gate when the gate blocks the flow passage.

The seats have seals which seal the seat to the counterbore of the flow passage. These seals prevent the entry of fluid from the flow passage or chamber of the body to the downstream flow passage. When the gate is opened, the seals perform no function. When the gate is closed, the seats may seal the chamber either on the upstream or the down stream side to prevent flow of fluid past the gate. Some seats float in the counterbore between the valve body and the gate. These floating seats may provide improved sealing characteristics as the seat is better able to seal to both the valve body and the gate as the gate moves through the cavity. This is due to the ability of the seat to adjust to the position of the gate in response to movement of the gate through the cavity.

Typical seals are formed of a thermoplastic or elastomer material and do not hold up well under high pressure, extreme high temperature, and extreme low temperature environments. For example, in high pressure environments, the thermoplastic materials do not reliably maintain a seal between the valve body and the seat ring. Similarly, in high temperature or low temperature environments, the thermoplastic seals do not reliably maintain a seal and break down at a more rapid rate. For example, in high pressure and high temperature extremes, elastomer and thermoplastic seals will begin to flake at points of contact with the seat and valve body. The flaking quickly breaks down the seal causing the seals to wear relatively quickly. The quick rate of failure means that the fluid will flow past the seals and prevent the seal and seat assembly from performing it's function. Therefore, seal replacement is a necessity during the life of the gate valve and gate valve seat. A typical seal is integral with the seat. Thus, when the seal is damaged or begins to wear past the point at which the seal is effective, the entire seat must be replaced to replace the seal. Replacing the entire seat is costly, and time consuming.

In order to overcome the problems with elastomeric seals, some gate valves employ metal seals between the gate valve body and the gate valve seats. While metal seals overcome the problems of elastomeric seals, metal seals are unable to be used in a floating seat configuration. This is because metal seals are pressed into sealing engagement between the seat and the valve body in an interference fit. If the seat were to move to maintain contact with the gate valve, the metal seal between the seat and the body would be relieved of the pressure of the interference fit and fail to maintain a seal. In addition, metal seals are again generally integral to the body of the seat, thus when the seal wears out, the entire seat and seal assembly must be replaced at great commitment of time and cost.

Fluid born through gate valves may often contain particles and debris, such as sand. Conventional seals are generally unable to effectively deal with such particles. If particles become wedged between the seal and the seat, or the seal and the body, the particles may allow for fluid to flow past the seal. In addition, such debris and particles may have a negative impact on the ability of the gate and the seal to operate as intended and variably allow passage of fluid downstream.

Therefore, there is a need for a replaceable gate valve seat seal for high pressure environments that provides a reliable seal at both high and low temperatures extremes, while operating as a particle exclusion device.

SUMMARY OF THE INVENTION

These and other problems are generally solved or circumvented, and technical advantages are generally achieved, by preferred embodiments of the present invention that provide a replaceable floating gate valve seat seal, and a method for using the same.

In accordance with an embodiment of the present invention, a gate valve seat for reception in a gate valve passage counterbore is disclosed. The gate valve seat includes a tubular body having a face for contact with a gate, and an outer end for location in the counterbore. An annular cylindrical surface of the tubular body defines a recess extending inward from the outer end of the tubular body. The gate valve seat includes a spring member having a cylindrical portion that fits on the cylindrical surface of the recess and a leg having a free end for abutting a shoulder of the counterbore. The gate valve seat also includes a metal-to-metal seal between the cylindrical portion of the spring member and the cylindrical surface of the recess.

In accordance with another embodiment of the present invention, a gate valve having a flow passage intersected by a chamber containing a gate and a counterbore formed in the flow passage is disclosed. The gate valve seat includes a tubular body having a face for contact with a gate, and an outer end for location in the counterbore and an annular cylindrical surface defining a recess extending inward from the outer end of the tubular body. A spring member fits on the cylindrical surface of a recess of the tubular body. The recess extends inward from the outer end of the tubular body. The spring member also includes a frustoconical leg having a free end for abutting a shoulder of the counterbore. The gate valve seat also includes a metal-to-metal seal between the cylindrical portion of the spring member and the cylindrical surface of the recess. The tubular body of the gate valve seat is adapted to fit loosely in the counterbore for axial movement relative to an axis of the passage.

In accordance with yet another embodiment of the present invention, a method of sealing around a seat ring of a gate valve is disclosed. The method comprises providing a tubular body having a face for contact with a gate, an outer end for location in the counterbore, and an annular cylindrical surface defining a recess extending inward from the outer end. Next, the method fits a spring member having a cylindrical portion on the cylindrical surface of the recess and abuts a frustoconical leg having a free end against a shoulder of the counterbore. The method creates a metal-to-metal seal between the cylindrical portion of the spring member and the cylindrical surface of the recess, and then the method adapts the body to fit loosely in the counterbore for axial movement relative to an axis of the passage.

An advantage of a preferred embodiment is that disclosed embodiments provide a metal seal for use with a floating gate valve seat. In addition, the seal may be replaced without changing the seat geometry. The seal is also operable in high pressure and high and low temperature environments. Furthermore, the disclosed embodiments provide a particle exclusion function.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

In the following discussion, numerous specific details are set forth to provide a thorough understanding of the present invention. However, it will be obvious to those skilled in the art that the present invention may be practiced without such specific details. Additionally, for the most part, details concerning valve construction, operation, use, and the like have been omitted inasmuch as such details are not considered necessary to obtain a complete understanding of the present invention, and are considered to be within the skills of persons skilled in the relevant art.

Figure 1:
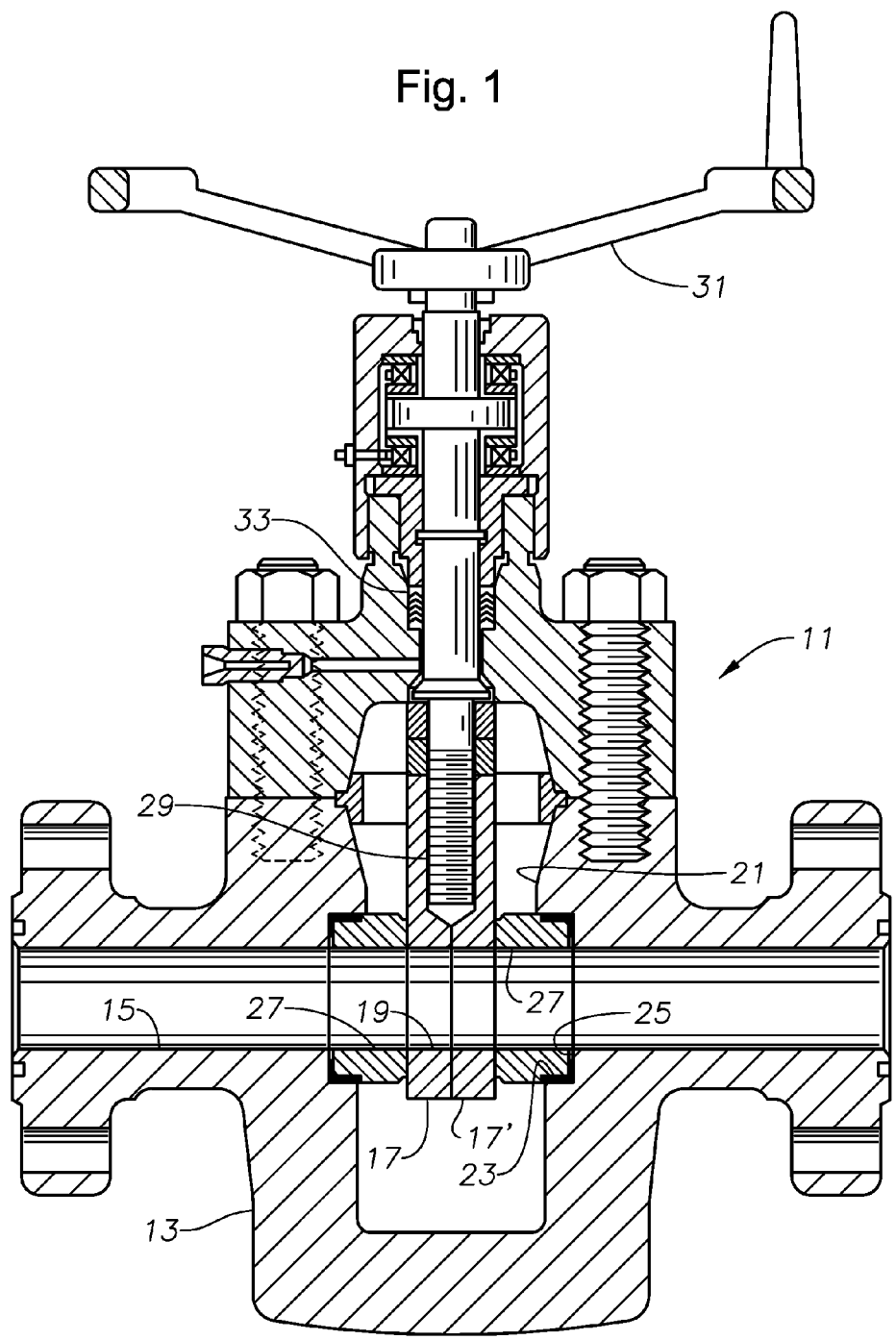
FIG. 1 illustrates a sectional view of an exemplary gate valve in accordance with an embodiment of the present invention.

Referring to FIG. 1, valve 11 is a standard gate valve. Valve 11 has a body 13, and a flow passage 15 that extends transversely through body 13. Valve 11 has a gate 17, 17' with a hole 19 therethrough. Gate 17 can be designed in one piece or two pieces. As illustrated, gate 17 may be split into two slabs, 17 and 17'. Each slab of gate 17 must either be open or closed at the same time. Gate 17 is shown in the open position in FIG. 1. Valve 11 shown in FIG. 1 is a non-rising-stem type valve, however, this invention can similarly be used on rising-stem type valves. When gate 17 is in the open position, hole 19 of gate 17 registers with flow passage 15 of valve 11 thereby allowing flow through valve 11. When gate 17 is closed, hole 19 no longer registers with flow passage 15 blocking flow of fluid through passage 15. A stem 29, when rotated, will cause gate 17 to move between the open and closed positions. A handle 31 is employed for rotating stem 29. A conventional packing assembly 33 provides sealing for stem 29.

Flow passage 15 intersects a central cavity or chamber 21 located in body 13. A counterbore is formed in flow passage 15 at each intersection with chamber 21. The counterbore has a cylindrical counterbore wall 23 that has an outer end terminating in a counterbore shoulder 25. Counterbore shoulder 25 is perpendicular to the axis of flow passage 15. A seat ring 27, described in more detail below with respect to FIG. 2, locates in each counterbore.

Figure 2:
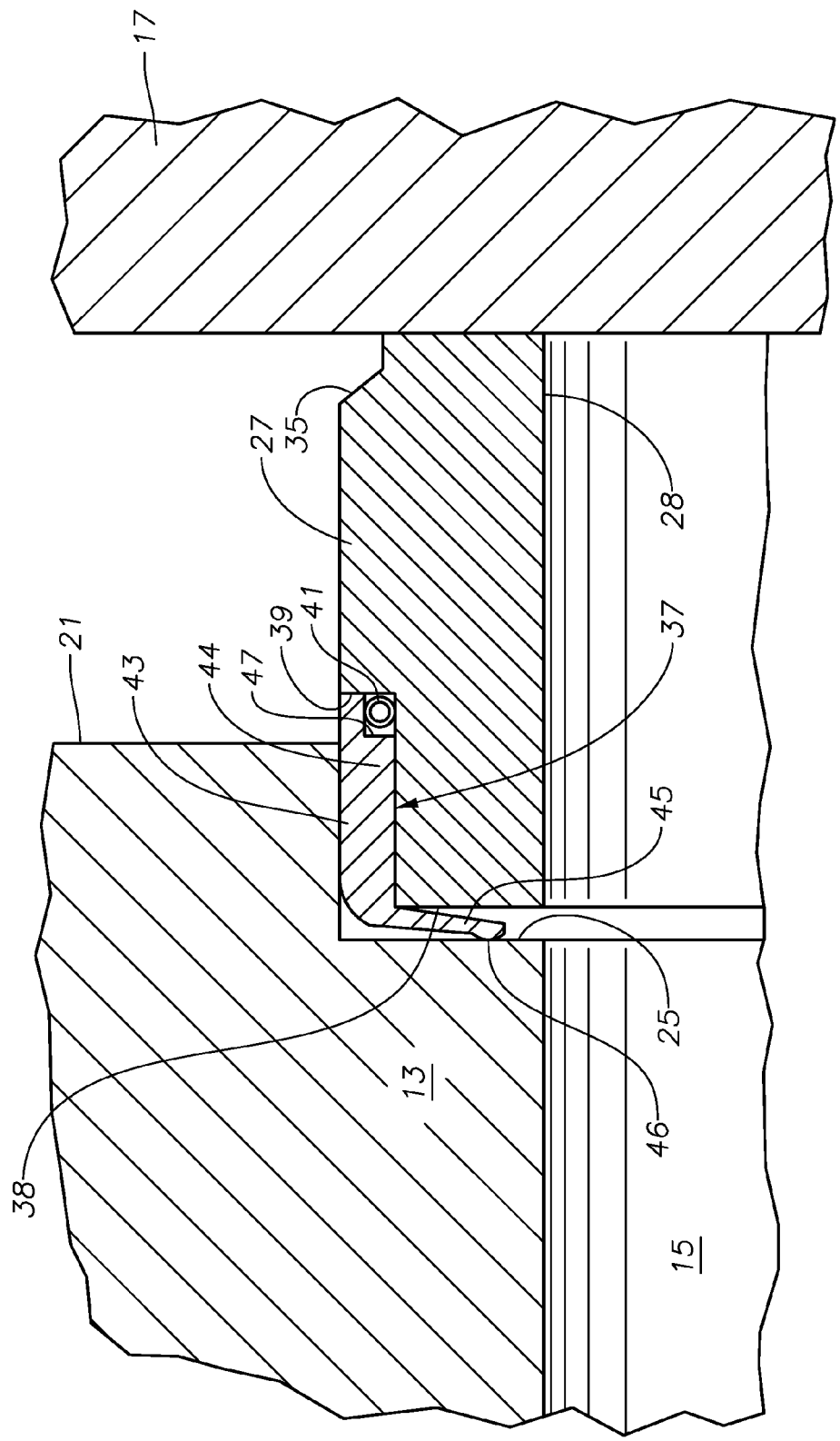
FIG. 2 illustrates a sectional view of an exemplary seat ring in use with the gate valve of FIG. 1.

Referring to FIG. 2, each seat ring 27 is a cylindrical, tubular member having a seal passage 28 extending through it. Seal passage 28 has a diameter approximately equal to the diameter for flow passage 15 and hole 19. Seat ring 27 defines a tapered surface 35 at an end proximate to gate 17. At an edge adjacent to body 13 and proximate to shoulder 25, seat ring 27 further defines an annular seat body recess 37. Seat body recess 37 extends from the outer end 38 of seat ring 27 inward to shoulder 39. Recess 37 has a smaller diameter than the exterior diameter of seat ring 27.

Each seat ring 27 may include an optional seal 41. An exemplary seal 41 is a hollow metal ring formed of any suitable sealing material for the particular application to which seat ring 27 is being put. Seal 41 situates such that seal 41 abuts shoulder 39 and cylindrical recess 37, thereby effecting a seal between the contact surfaces. In this manner, seal 41 may provide a portion of a metal-to-metal seal between seat ring 27 and body 13.

Each seat ring 27 includes a spring member 43. Spring member 43 is an annular member having an approximately L-shaped profile that extends the length of seat body recess 37 and has a leg portion 45 interposed between outer end 38 of seat ring 27 and shoulder 25 of body 13. An exemplary spring member 43 is formed of a high performance nickel chromium alloy such as Inconel® 718 or 625+. Spring member 43 may have a spring force sufficient to pre-load the seal between outer end 38 of seat 27 and body 13 and maintain the seal in low pressure situations. For example, spring member 43 will have spring force equal to the force necessary to move seat ring 27 axially inward against gate 17 plus an additional 10 p.s.i. Leg portion 45 of spring member 43 is at a slant relative to a plane perpendicular to the axis of passage 15. The inclination allows a free end 46 of leg portion 45 to contact shoulder 25. Leg 45 thus comprises a frustoconical surface with the concave side of the conical surface facing axially inward toward gate 17. The opening defined by the convex side of leg 45 is smaller than the diameter of the a cylindrical portion 44 of spring member 43 that fits on recess 37. Spring member 43 defines an annular recess 47 at an interior end of spring member 43 proximate to seal 41. Spring member 43 provides a spring force pushing seat ring 27 against gate 17 to maintain an energized seal with gate member 17. In addition, spring member 43 maintains pressure on seal 41 and forms a metal-to-metal seal at the contact point between leg portion 45 of spring member 43 and shoulder 25.

In operation, when gate 17 is in the open position, fluid flows through flow passage 15, and seal 41 and spring member 43 will not perform any function. Fluid is able to communicate past the face of seat ring 27 and gate 17, thus resulting in no pressure differential across the seal and seat members. When gate 17 is moved to the closed position, fluid pressure against gate 17 will push gate 17 away from the sealing interface between the upstream side of gate 17 and seat ring 27. In response, spring member 43 will react against shoulder 25 to push seat ring 27 against gate 17, maintaining the seal. In addition, spring member 43 will exert a reactive force against seal 41 such that seal 41 will maintain contact with seat body 27 preventing passage of fluid past seat ring 27 into cavity 21 and around gate 17. As fluid pressure increases on the upstream side of gate 17, fluid will attempt to push past spring member 43, however, because spring member 43 angles away from seat ring 27 toward passage 15 and is in contact with shoulder 25, fluid will push against the portion of spring member 43 facing seat 27, thus creating a pressure seal at spring member 43 that increases fluid pressure.

In a similar manner, spring member 43 and seat 27 act as a particle excluder. As fluid attempts to push past spring member 43, particles suspended within the fluid in passageway 15 will be directed against leg portion 45 of spring member 43 by increasing fluid pressure in front of gate 17. The particles will become lodged within the v-shaped annular space between valve seat 27 and leg portion 45 of spring member 43, thereby becoming trapped from the passage flow. This process will prevent passage of these particles further downstream where they may impede seal formation at other pipeline devices or objects having lower tolerances for suspended particles within in handled fluids.

In the exemplary embodiment, seal 41 and spring member 43 may be replaced when damaged or worn out. First, an operator may machine out the worn or damaged spring member 43 and seal 41. Next, the operator cools seat ring 27 to a temperature that allows for reduction of seat geometry. In the exemplary embodiment, the reduced seat geometry corresponds with a 0.0002 to 0.0005 inch reduction on a radial basis. Simultaneously, the operator heats seal 41, increasing the diametric size of seal 41. The operator then passes seal 41 around seat 27 such that seal 41 will slide across surface 38 and abut shoulder 39, as shown in FIG. 2. The operator then inserts spring member 43 into seat body recess 37 as shown in FIG. 2. As each piece returns to the ambient temperature, a shrink fit between seal 41 and seat ring 27 is achieved. Thus, replacing seal 41 and seat member 43 without changing the geometry of seat ring 27 or requiring a replacement of seat ring 27 itself.

Figure 3:
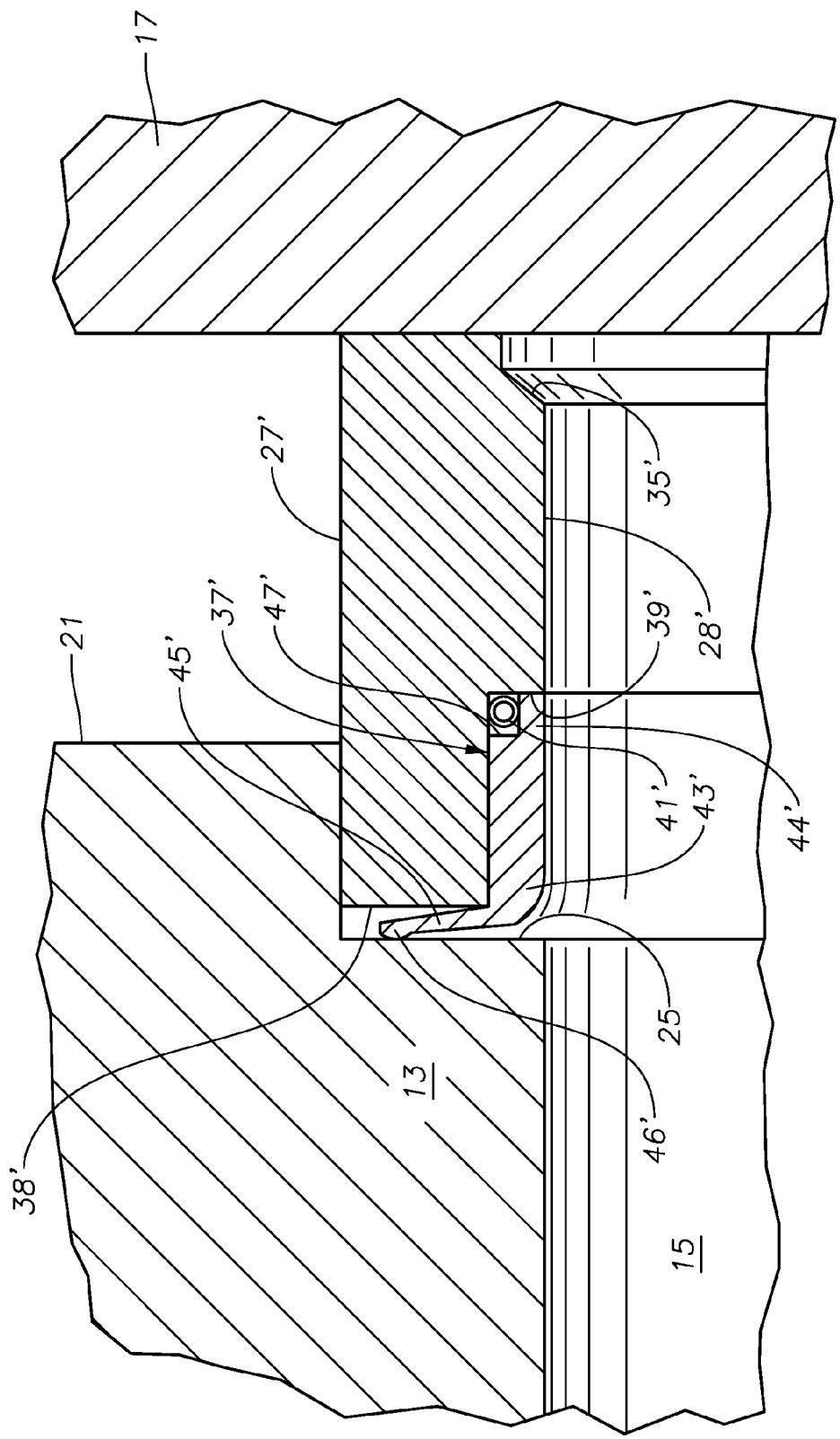
FIG. 3 illustrates a sectional view of an alternative seat ring.

In an alternative embodiment, illustrated in FIG. 3, seat ring 27 may be modified as seat ring 27'. Similar to seat ring 27 of FIG. 1 and FIG. 2, seat ring 27' locates in each counterbore of body 13 at chamber 21 and passage 15, Each seat ring 27' is a cylindrical, tubular member having a seal passage 28' extending through it. Seal passage 28' has a diameter approximately equal to the diameter for flow passage 15 and hole 19. Seat ring 27' defines a tapered surface 35' at an end proximate to gate 17 and passage 15. At an edge adjacent to passage 15 and proximate to shoulder 25, seat ring 27' further defines a seat body recess 37'. Seat body recess 37' extends from the interior diameter surface of seat ring 27' adjacent to passage 15 inward from outer end 38' to shoulder 39'.

Each seat ring 27' may include an optional seal 41'. An exemplary seal 41' is a hollow metal o-ring formed of any suitable sealing material for the particular application to which seat ring 27' is being put. Seal 41' situates such that seal 41' abuts shoulder 39' at the intersection of shoulder 39' with surface 38', contacting both shoulder 39' and surface 38', thereby effecting a seal between the contact surfaces. In this manner, seal 41' may provide a portion of a metal-to-metal seal between seat ring 27' and body 13.

Each seat ring 27' includes a spring member 43'. Spring member 43' is an annular member having an approximately L-shaped profile that extends the length of seat body recess 37' and has a frustoconical leg portion 45' interposed between seat ring 27' and shoulder 25 of body 13. leg portion 45' extends away from the axis of passage 15. The concave portion of the conical surface of leg 45' faces outward. An exemplary spring member 43' is formed of a high performance nickel chromium alloy such as Inconel® 718 or 625+. Spring member 43' may have a spring force sufficient to pre-load the seal between seat 27' and body 13 and maintain the seal in low pressure situations. For example, spring member 43' will have spring force equal to the force necessary to move seat ring 27' against gate 17 plus an additional 10 p.s.i. Leg portion 45' of spring member 43' forms an angle that is at a slant to a plane perpendicular to the axis of passage 15, allowing a free end 46' of leg portion 45' to contact shoulder 25. Spring member 43' defines an annular recess 47' at an interior end of spring member 43' proximate to seal 41'. Spring member 43' provides a spring force pushing seat ring 27' against gate 17 to maintain an energized seal with gate member 17. In addition, spring member 43' maintains pressure on seal 41' and forms a metal-to-metal seal at the contact point between leg portion 45' of spring member 43' and shoulder 25.

Figure 4:
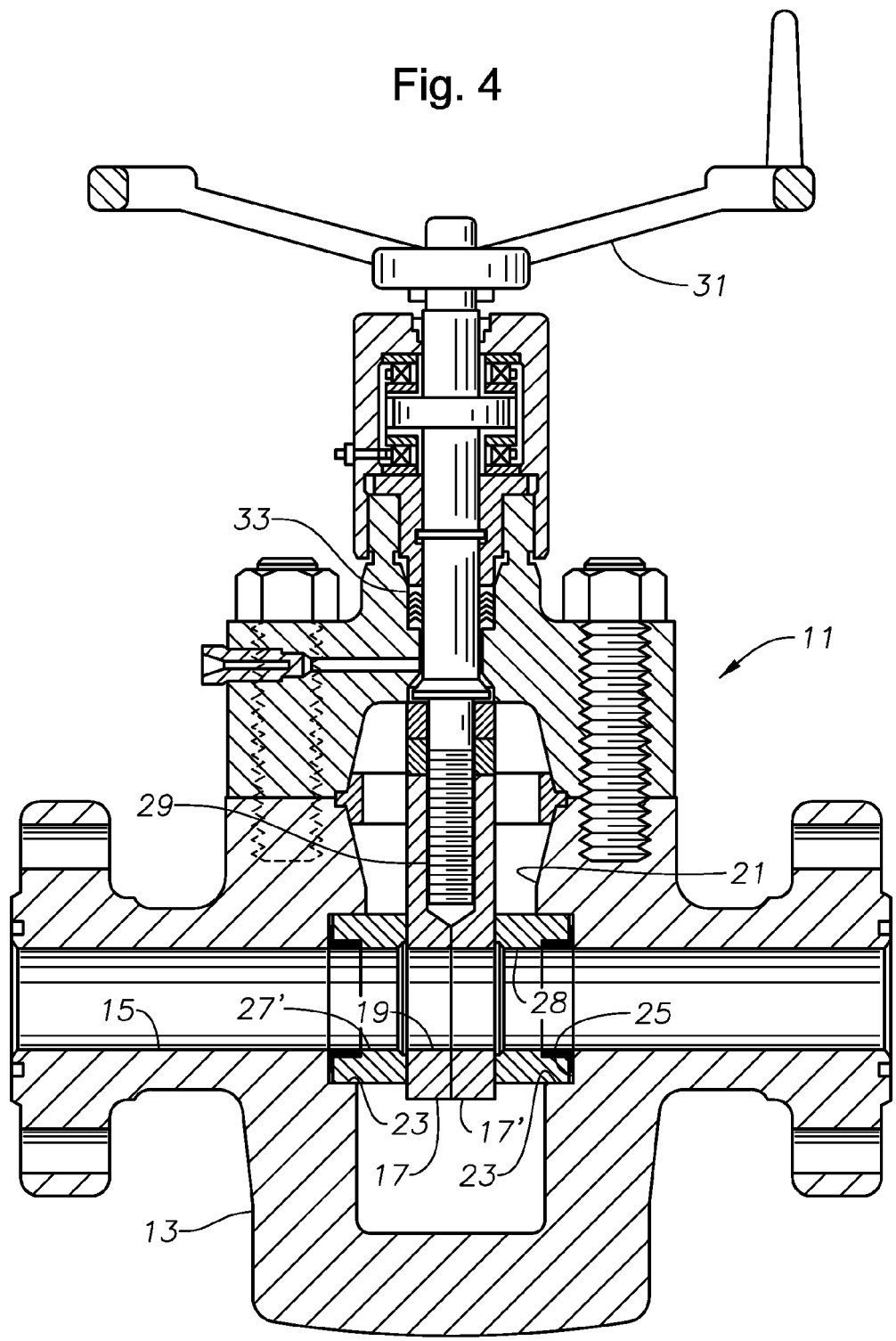
FIG. 4 illustrates a sectional view of the gate valve of FIG. 1 employing the exemplary seats of FIG. 3.

In operation, as shown in FIG. 4, when gate 17 is in the open position, fluid flows through flow passage 15, and seal 41' and spring member 43' will not perform any function. Fluid is able to communicate past the face of seat ring 27' and gate 17, thus resulting in no pressure differential across the seal and seat members. When gate 17 is moved to the closed position, fluid pressure against gate 17 will push gate 17 away from the sealing interface between the upstream side of gate 17 and seat ring 27'. In response, spring member 43' will react against upstream shoulder 25 to push seat ring 27' against gate 17. However, because leg portion 45' of spring member 43' is angled away from passage 15, fluid may flow between spring member 43', past the abutting surfaces of seat ring 27' and body 13, and into chamber 21. At the upstream side, fluid will flow past gate 17 and the against the downstream seat ring 27'. The downstream seat ring 27' will operate in a manner similar to upstream seat ring 27 of FIG. 1 and FIG. 2.

Spring member 43' will react against downstream shoulder 25 to push downstream seat ring 27' against gate 17. In addition, spring member 43' will exert a reactive force against seal 41' such that seal 41' will maintain contact with seat body 27' preventing passage of fluid past seat ring 27' into downstream passage 15. As fluid pressure increases within chamber 21, fluid will attempt to push past spring member 43'; however, because spring member 43' angles away from passage 15 and is in contact with downstream shoulder 25, fluid will push against the portion of spring member 43' facing seat 27', thus creating a pressure seal at spring member 43' that increases with increased fluid pressure.

In a similar manner, downstream spring member 43' and seat 27' act as a particle excluder. As fluid attempts to push past spring member 43', particles suspended within the fluid in chamber 21 will be directed against leg portion 45' of spring member 43' by increasing fluid pressure. The particles will become lodged within the v-shaped annular space between valve seat 27' and leg portion 45' of spring member 43', thereby becoming trapped from the passage flow. This process will prevent passage of these particles further downstream where they may impede seal formation at other pipeline devices or objects having lower tolerances for suspended particles within in handled fluids.

Generally, seat rings 27 and spring members 43 will be assembled within valve 11 such that both upstream and downstream leg portions 45 of spring members 43 will face passage 15 as in FIG. 1 and FIG. 2, or face chamber 21 as in FIG. 3 and FIG. 4. This will allow sealing at either the upstream seat ring 27 (FIG. 2), or the downstream seat ring 27' (FIG. 3). In the event fluid flow is reversed through the embodiments of FIG. 1 or FIG. 4, seat rings 27 of FIG. 1 and seat rings 27' of FIG.

Figure 5:
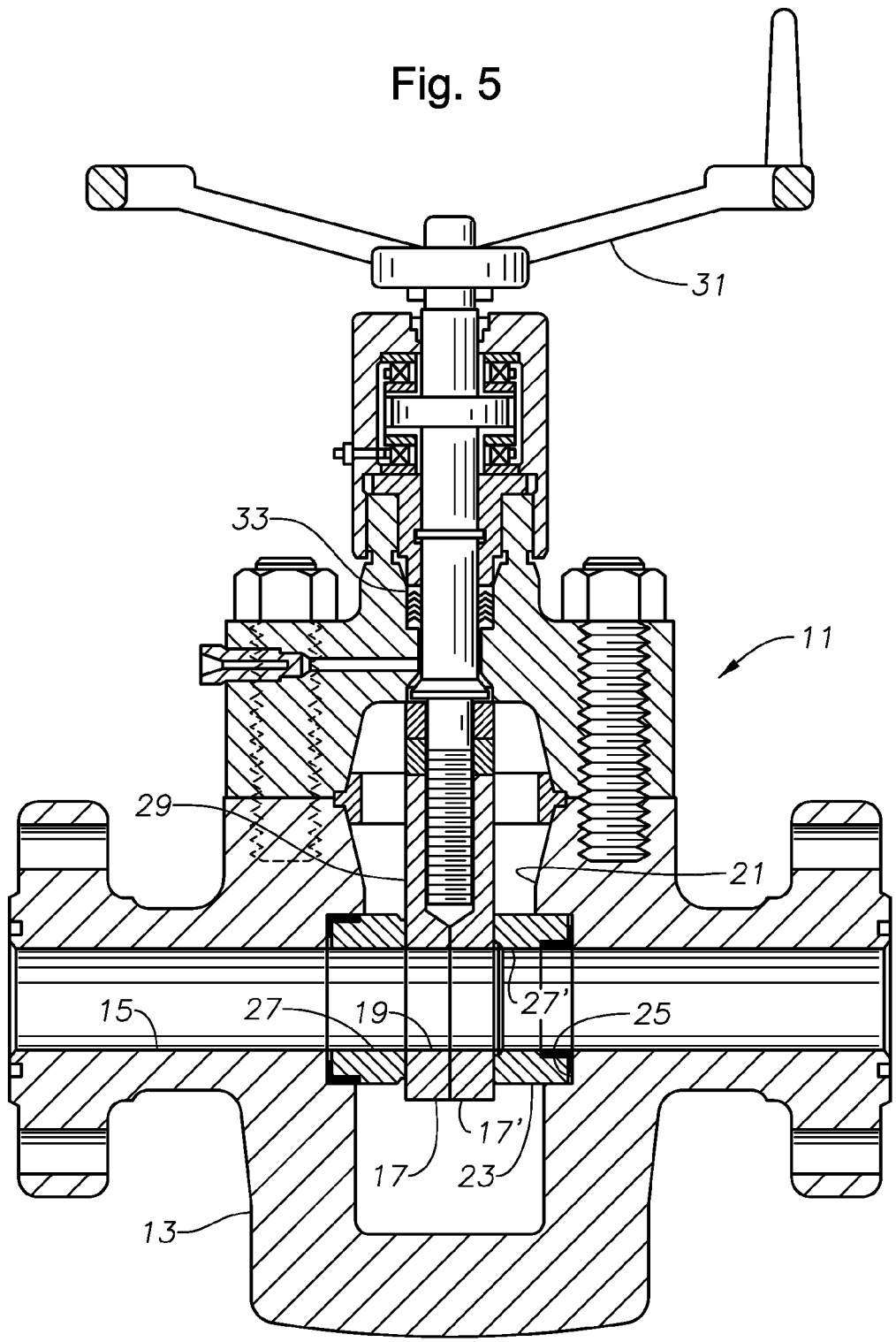
FIG. 5 illustrates a sectional view of the gate valve of FIG. 1 employing the exemplary seats of FIG. 2 and FIG. 3.

4 will maintain an effective seal. However, alternative embodiments may include a seat ring 27 on the upstream side of gate 17, and a seat ring 27' as shown in FIG. 5. Seat ring 27 includes the components of and operates as seat ring 27 of FIG. 1 and FIG. 2. Similarly, seat ring 27' includes the components of and operates as seat ring 27' of FIG. 3 and FIG. 4. In this manner, chamber 21 may be sealed against passage 15 on the upstream side of gate 17, and in the event fluid fills chamber 21, seat ring 27' will seal downstream passage 15 from chamber 21. However, if fluid flow is reversed in the embodiment of FIG. 5, neither seat will provide an effective seal.

Accordingly, the disclosed embodiments provide numerous advantages over prior devices for sealing a gate valve seat. For example, unlike conventional thermoplastic seals, the disclosed embodiments maintain seal integrity in high pressure environments in both high temperature and low temperature extremes. In addition, the disclosed embodiments provide a sand exclusion function. Furthermore, the disclosed embodiments provide significant cost savings over conventional seat ring seals that require replacement of the entire seat ring when damaged or significantly worn. Unlike prior art seals, the disclosed embodiment provides a metal seal for a floating seat in a gate valve. The metal seal is a higher strength seal often lasting longer than conventional sealing means.

It is understood that the present invention may take many forms and embodiments. Accordingly, several variations may be made in the foregoing without departing from the spirit or scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A gate valve seat circumscribing a passage formed through a gate valve body comprising:
    a tubular body having a face for contact with a gate, and an outer end extending into a counterbore formed in the gate valve body;
    an annular cylindrical surface defining a recess extending inward from the outer end of the tubular body;
    a spring member having a cylindrical portion that fits on the cylindrical surface of the recess and a leg having a free end for abutting a shoulder of the counterbore; and
    a metal-to-metal seal between the cylindrical portion of the spring member and the cylindrical surface of the recess; and
    wherein the seal is located in a recess found in the spring member.

2. The gate valve seat of claim 1, wherein the leg has a frustoconical configuration.

3. The gate valve seat of claim 1, wherein the recess of the tubular body has a shoulder facing outward and the seal is located at the shoulder.

4. The gate valve seat of claim 1, wherein the seal is located in a recess of the spring member on an end of the spring member opposite the leg.

5. The gate valve seat of claim 1, wherein the tubular body is adapted to fit loosely in the counterbore for axial movement relative to an axis of the passage.

6. The gate valve seat of claim 1, wherein the recess in the tubular body is located on an exterior of the tubular body.

7. The gate valve seat of claim 6, wherein the leg extends from the cylindrical portion toward an axis of the tubular body.

8. The gate valve seat of claim 1, wherein the recess on the tubular body is located in an interior of the tubular body.

9. The gate valve seat of claim 8, wherein the leg extends from the cylindrical portion away from an axis of the tubular body.

10. The gate valve seat of claim 1, wherein the cylindrical portion of the spring member has an inner diameter initially smaller than the outer diameter of the annular cylindrical surface of the recess of the tubular body so that the spring member fits on the tubular body by an interference fit to apply a radial preload force against the metal-to-metal seal.

11. A gate valve comprising:
    a body having a chamber;
    a passage intersecting the body and the chamber;
    a gate moveable in the chamber and having a bore in the gate that is selectively registerable with the passage;
    annular counterbores circumscribing the passage in a portion of the body adjacent the chamber, and that each have a curved sidewall that depends axially from a planar face;
    annular seat seals generally coaxial with the passage and each having an inner end in contact with the gate, and an outer end inserted within a one of the counterbores;
    annular recesses on outer ends of the seat seals;
    spring members, each having an annular base portion set into a one of the recesses and generally coaxial with the passage, and an annular leg portion with an outer diameter coupled to an axial end of the base portion and an inner diameter in sealing contact with a one of the planar faces; and
    metal-to-metal seals located in grooves found in each of the spring members.

12. The gate valve of claim 11, wherein the grooves each have a shoulder facing outward and the seal is located at the shoulder.

13. The gate valve of claim 1, wherein the grooves are located on ends of the base portions opposite the legs.

14. The gate valve of claim 11, wherein:
    the recesses are located on exteriors of the seat seals; and
    the legs extend toward an axis of the seat seals.

15. The gate valve of claim 11, wherein:
    the recesses are located in interiors of the seat seals; and
    the legs extend from the base portions away from an axis of the seat seals.

16. A method of sealing in a gate valve having a body, chamber in the body, a passage intersecting the body and the chamber, and a gate moveable within the chamber having a bore that selectively registers with the passage, the method comprising:
    (a) providing an annular seat ring having an inner end with a face for contact with the gate, an outer end for location in a counterbore in the body that circumscribes the passage and is adjacent the chamber, and an annular recess formed on a surface of the seat ring extending axially from the outer end;
    (b) providing a spring member having an annular base portion that is generally coaxial with the passage, and an annular leg portion having an outer diameter that depends from a lateral edge of the base portion, an inner diameter set radially inward from the base portion, and having a frustoconical cross section;
(c) fitting the spring member on the seat ring so that the base portion is set in the annular recess and inner diameter of the leg portion is axially set back from the outer end of the seat ring in a direction away from the inner end of the seat ring;
(d) inserting the seat ring into the chamber so that the outer end of the seat ring projects into the counterbore, and so that the leg portion is in sealing contact with a planar surface in the counterbore; and
(e) sealing between the base portion and the seat ring with a hollow metal o-ring.

17. The method of claim 16, wherein the recess formed on one of an outer surface of the seat ring, or an inner surface of the seat ring.

* * * * *